(12) United States Patent
Kim et al.

(10) Patent No.: US 10,018,154 B2
(45) Date of Patent: Jul. 10, 2018

(54) FUEL SYSTEM FOR BI-FUEL VEHICLE AND METHOD OF FILLING BI-FUEL VEHICLE WITH LPG FUEL USING THE SAME

(71) Applicant: Hyundai Motor Company, Seoul (KR)

(72) Inventors: Chang Han Kim, Gwangju (KR); Jong Ki Kim, Gyeonggi-Do (KR); Jae Hwa Park, Gyeonggi-Do (KR); Jae Min Lee, Chungcheongnam-do (KR)

(73) Assignee: Hyundai Motor Company, Seoul (KR)

( * ) Notice: Subject to any disclaimer, the term of this patent is extended or adjusted under 35 U.S.C. 154(b) by 201 days.

(21) Appl. No.: 15/203,077

(22) Filed: Jul. 6, 2016

(65) Prior Publication Data
US 2017/0107948 A1    Apr. 20, 2017

(30) Foreign Application Priority Data

Oct. 20, 2015    (KR) .................... 10-2015-0145756

(51) Int. Cl.
*F02M 21/00* (2006.01)
*F02M 21/02* (2006.01)
(Continued)

(52) U.S. Cl.
CPC ....... *F02M 21/0212* (2013.01); *F02D 19/027* (2013.01); *F02D 41/0025* (2013.01); *F02D 41/0027* (2013.01); *F02D 41/0042* (2013.01); *F02M 21/0218* (2013.01); *F02M 21/0224* (2013.01); *F02M 21/0236* (2013.01);
(Continued)

(58) Field of Classification Search
CPC ............ F02D 19/0647; F02M 37/0064; F02M 21/0224; F02M 25/08; F02M 25/089; Y02T 10/36; Y02T 10/32; B60K 2015/03355; B60K 2015/0319; B60K 2015/03576
See application file for complete search history.

(56) References Cited

U.S. PATENT DOCUMENTS 5,560,212 A * 10/1996 Hansen ................ B60H 1/3202
  62/238.1
9,869,281 B2 * 1/2018 Cai ..................... F02M 25/0854
(Continued)

FOREIGN PATENT DOCUMENTS

JP    2004-285987 A    10/2004
JP    2009-097355 A     5/2009
(Continued)

*Primary Examiner* — Hieu T Vo
*Assistant Examiner* — Sherman Manley
(74) *Attorney, Agent, or Firm* — Mintz Levin Cohn Ferris Glovsky and Popeo, P.C.; Peter F. Corless

(57) ABSTRACT

A fuel system for a bi-fuel vehicle, which is provided with an engine and an LPG tank connected to each other through a fuel supply line and a fuel return line through which liquefied petroleum gas (LPG) fuel passes, includes: a 3-way valve which is installed in the fuel return line, and selectively opened and closed to move returning LPG fuel to a canister connected with a fuel tank; and a return tube, which branches off from the fuel return line, installed so that the returning LPG fuel passes through the canister in accordance with an operation of the 3-way valve, allowing the LPG fuel of which the temperature is decreased by heat exchange while the LPG fuel passes through the canister to move to the fuel return line.

10 Claims, 7 Drawing Sheets

(51) Int. Cl.
*F02D 19/02* (2006.01)
*F02D 41/00* (2006.01)
*F02M 25/08* (2006.01)
*F02M 33/08* (2006.01)

(52) U.S. Cl.
CPC .......... *F02M 25/08* (2013.01); *F02M 25/089* (2013.01); *F02M 25/0854* (2013.01); *F02M 33/08* (2013.01); *F02M 2025/0881* (2013.01); *Y02T 10/32* (2013.01)

(56) References Cited

U.S. PATENT DOCUMENTS

| | | | |
|---|---|---|---|
| 2013/0146145 A1* | 6/2013 | Song | F17C 5/007 137/1 |
| 2014/0245995 A1* | 9/2014 | Deliyski | F02M 69/50 123/456 |
| 2015/0192064 A1* | 7/2015 | Criel | B60R 21/0136 123/529 |
| 2017/0067415 A1* | 3/2017 | Cai | F02M 25/0854 |

FOREIGN PATENT DOCUMENTS

| | | |
|---|---|---|
| JP | 2011-247368 A | 12/2011 |
| KR | 10-0203508 B1 | 6/1999 |
| KR | 10-1291025 B1 | 7/2013 |
| KR | 10-1371485 | 3/2014 |
| KR | 10-2014-0052532 | 5/2014 |

* cited by examiner

FUEL SYSTEM FOR BI-FUEL VEHICLE AND METHOD OF FILLING BI-FUEL VEHICLE WITH LPG FUEL USING THE SAME

CROSS-REFERENCE TO RELATED APPLICATION

This application claims under 35 U.S.C. § 119(a) the benefit of Korean Patent Application No. 10-2015-0145756 filed on Oct. 20, 2015, the entire contents of which are incorporated herein by reference.

BACKGROUND (a) Technical Field

The present disclosure relates to a fuel system for a bi-fuel vehicle and a method of charging a bi-fuel vehicle with liquefied petroleum gas (LPG) fuel using the same, more particularly, to a fuel system that decreases pressure in an LPG tank for a bi-fuel vehicle.

(b) Description of the Related Art

In general, an engine for a vehicle combusts fuel to reciprocally move pistons in order to obtain power required to drive the vehicle, and the reciprocating motion of the pistons is converted into rotational motion, thereby driving the vehicle.

As described above, the combustion of fuel is an essential element for driving the vehicle.

Recently, vehicles that use electricity or hydrogen as a power source have been produced, but these vehicles have not yet been widely used, and gasoline, gas or the like is typically used as fuel of the vehicle.

In this regard, a vehicle that stores both gasoline fuel and gas fuel so that the fuel may be selected and supplied to the vehicle in accordance with a driver's intention, is referred to as a bi-fuel vehicle (also known as a dual fuel vehicle). For example, one internal combustion fuel can be gasoline (or diesel), and another internal combustion fuel can be "gas," such as compressed natural gas (CNG) or liquefied petroleum gas (LPG).

That is, the bi-fuel vehicle means a vehicle which stores two types of fuel, and the driver may obtain economic efficiency by supplying the vehicle with gas fuel that is inexpensive compared to gasoline fuel, or may obtain higher driving performance and improve vehicle performance by supplying the vehicle with gasoline fuel which exhibits better fuel efficiency compared to gas fuel.

However, in the case of the bi-fuel vehicle, at the time of charging a vehicle with liquefied petroleum gas (LPG) fuel in summer, a temperature in an LPG tank in the vehicle is increased because of an outside temperature in summer, and pressure in the LPG tank is increased accordingly, and as a result, the pressure in the LPG tank becomes higher than a charging pressure of an LPG fuel station, which may result in a problem of filling the vehicle with LPG.

The above information disclosed in this Background section is only for enhancement of understanding of the background of the invention and therefore it may contain information that does not form the prior art that is already known in this country to a person of ordinary skill in the art.

SUMMARY

The present invention provides a fuel system for a bi-fuel vehicle and a method of filling a bi-fuel vehicle with liquefied petroleum gas (LPG) fuel, which are capable of decreasing a temperature of LPG fuel being supplied to an LPG tank of the vehicle by controlling a valve in accordance with pressure in the LPG tank so that the LPG fuel returns from an engine and passes through a canister, thereby allowing a heat exchange to be performed in the canister.

In one aspect, the present invention provides a fuel system for a bi-fuel vehicle, which is provided with an engine and an LPG tank which are connected to each other through a fuel supply line and a fuel return line through which LPG fuel passes, the fuel system including: a 3-way valve which is installed in the fuel return line, and selectively opened and closed to move returning LPG fuel to a canister connected with a fuel tank; and a return tube, which branches off from the fuel return line, installed so that the returning LPG fuel passes through the canister in accordance with an operation of the 3-way valve, allowing the LPG fuel of which the temperature is decreased by heat exchange while the LPG fuel passes through the canister to move to the fuel return line.

In a preferred embodiment, the return tube may include: an inflow line which branches off from the fuel return line, and is connected to an inlet side of the canister; a passing line which is installed to pass through the canister, and defines a section for heat exchange of the returning LPG fuel; and an outflow line which is connected to an outlet side of the canister, and allows the LPG fuel, which has exchanged heat, to move to the fuel return line.

In another preferred embodiment, the passing line may be installed inside the canister.

In still another preferred embodiment, the passing line may be installed outside the canister.

In yet another preferred embodiment, the passing line may have a 'U' shape to increase a heat exchange area in the canister.

In still yet another preferred embodiment, the outflow line may be provided with a check valve which blocks the LPG fuel, which returns from the engine, from reversely flowing to the canister when the LPG fuel moves to the LPG tank by passing through the fuel return line.

In another aspect, the present invention provides a method of filling a bi-fuel vehicle with LPG fuel, the method including steps of: measuring pressure in a LPG tank; performing a purge of a canister connected with a fuel tank when the pressure in the LPG tank is higher than a predetermined pressure; turning on a 3-way valve installed in a fuel return line so as to allow LPG fuel, which returns from an engine, to move to the canister through a return tube; and supplying the LPG fuel of which the temperature is decreased by heat exchange while the LPG fuel passes through the canister, to the fuel return line through the return tube so as to allow the LPG fuel to move to the LPG tank.

In a preferred embodiment, the step of performing the purge may include turning off the 3-way valve so as to allow the LPG fuel to move along the fuel return line and move to the LPG tank when the pressure in the LPG tank is lower than the predetermined pressure.

In another preferred embodiment, the step of performing the purge may include turning off a check valve installed in the return tube so as to block the LPG fuel, which moves to the LPG tank along the fuel return line, from reversely flowing to the return tube.

In still another preferred embodiment, the step of supplying the LPG fuel may include decreasing a temperature of the LPG fuel by absorbing heat of the LPG fuel which passes through the canister by the purge of the canister which is performed in the first step.

According to the present invention, the valve is controlled in accordance with the pressure in the LPG tank so that the LPG fuel, which returns from the engine, passes through the canister and heat exchange is performed in the canister, thereby decreasing a temperature of the LPG fuel that is supplied to the LPG tank.

Accordingly, in the present invention, as a temperature of the LPG fuel is decreased, the pressure in the LPG tank may be lower than charging pressure of the LPG fuel station, and as a result, it is possible to easily fill the bi-fuel vehicle with the LPG fuel regardless of high outside temperatures.

Detachment efficiency in the canister is improved by thermal energy of the LPG fuel which is lost while the LPG fuel passes through the canister, thereby reusing the lost thermal energy of the LPG fuel.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
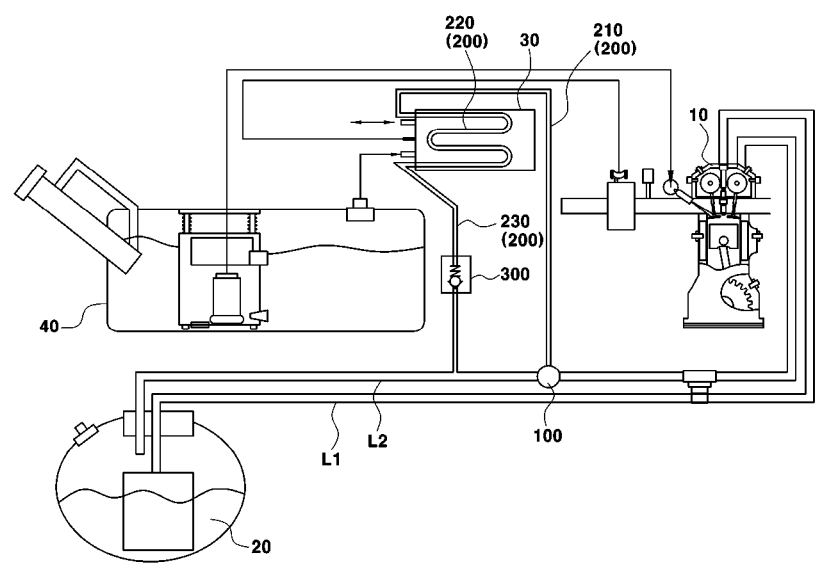
FIG. 1 is a view illustrating a fuel system for a bi-fuel vehicle according to a first exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the exemplary embodiment of the present invention will be described in detail with reference to the accompanying drawings.

Advantages and features of the present invention and methods of achieving the advantages and features will be clear with reference to exemplary embodiments described in detail below together with the accompanying drawings.

However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims.

In the description of the present invention, a detailed explanation of publicly known related technologies may be omitted so as to avoid unnecessarily obscuring the subject matter of the present invention.

Figure 2:
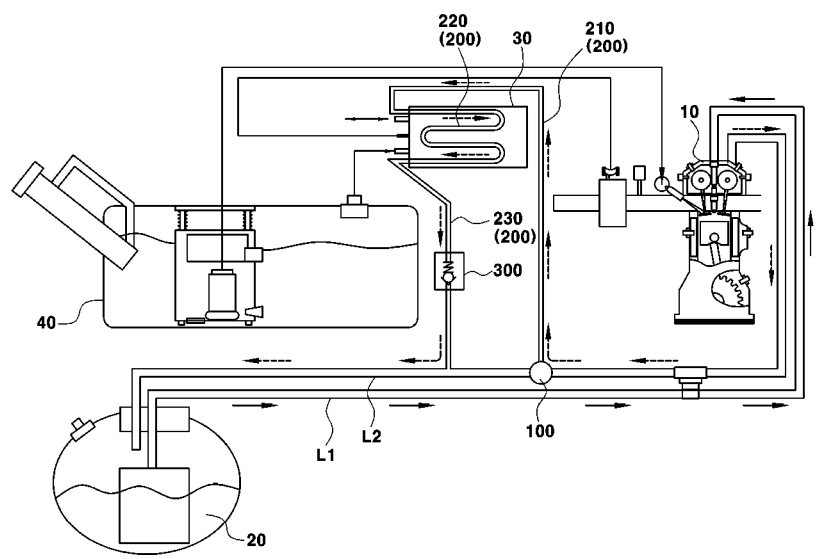
FIG. 2 is a view illustrating a pathway of LPG fuel passing through a canister in the fuel system for a bi-fuel vehicle according to the first exemplary embodiment of the present invention.

FIG. 1 is a view illustrating a fuel system for a bi-fuel vehicle according to a first exemplary embodiment of the present invention, and FIG. 2 is a view illustrating a pathway of LPG fuel passing through a canister in the fuel system for a bi-fuel vehicle according to the first exemplary embodiment of the present invention.

Figure 3:
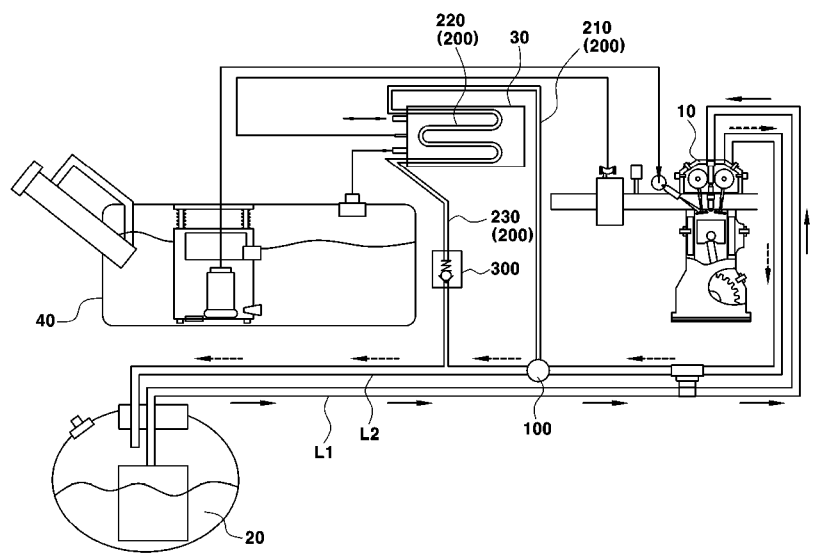
FIG. 3 is a view illustrating a pathway of LPG fuel passing through a fuel return line in the fuel system for a bi-fuel vehicle according to the first exemplary embodiment of the present invention.
Figure 4:
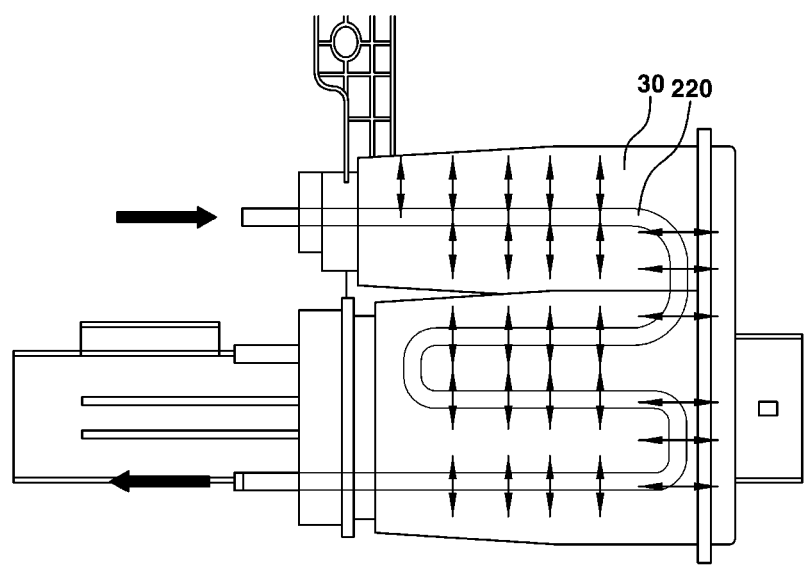
FIG. 4 is a view illustrating heat exchange in the canister in the fuel system for a bi-fuel vehicle according to the first exemplary embodiment of the present invention.

FIG. 3 is a view illustrating a pathway of LPG fuel passing through a fuel return line in the fuel system for a bi-fuel vehicle according to the first exemplary embodiment of the present invention, and FIG. 4 is a view illustrating heat exchange in the canister in the fuel system for a bi-fuel vehicle according to the first exemplary embodiment of the present invention.

As illustrated in FIG. 1, a fuel system for a bi-fuel vehicle, which is provided with an engine 10 and an LPG tank 20 which are connected to each other through a fuel supply line L1 and a fuel return line L2 through which LPG fuel passes, includes a 3-way valve 100 installed in the fuel return line L2, and a return tube 200, in order to decrease pressure in the LPG tank 20. The LPG tank 20 is a device configured to receive LPG fuel, and may be alternatively referred to as a "bombe" or an LPG reservoir or receptacle.

That is, because of a high atmospheric temperature in summer or at a hot location, pressure in the LPG tank 20 is higher than charging pressure of an LPG fuel station at the time of filling the vehicle with the LPG fuel, and as a result, it is impossible to fill the LPG tank 20 with the LPG fuel.

To this end, previous attempts to address this problem utilized a separate heat protector and a heat insulating cover added to inhibit a temperature increase in the LPG tank 20, but an effect thereof is insignificant. However, in the present exemplary embodiment, it is possible to decrease a temperature of the LPG fuel by performing heat exchange of the LPG fuel that returns to the fuel return line L2.

First, the 3-way valve 100 is installed in the fuel return line L2, and moves the returning LPG fuel to a canister 30 connected to a fuel tank 40 by being selectively opened.

Here, the canister 30 is typically installed in a vehicle, and serves as an intermediate medium to capture evaporated gas generated in the fuel tank 40, inhibit hydrocarbon (HC) gas from being discharged into the atmosphere, and send the HC gas to the engine so that the HC gas is combusted when the vehicle is driven.

The 3-way valve 100 is installed in a region, which branches off from the fuel return line L2 and is connected to the return tube 200, and sends the LPG fuel, which returns from the engine 10, to the return tube 200 when a predetermined condition is satisfied.

The 3-way valve 100 is configured as a solenoid valve, and the configuration of the solenoid valve is the same as a configuration of a typical solenoid valve, and thus a detailed description thereof will be omitted.

The return tube 200 branches off from the fuel return line L2, and is installed to pass through the canister 30, thereby performing heat exchange of the returning LPG fuel.

The return tube 200 defines a predetermined pathway that branches off from the fuel return line L2, passes through the canister 30, and then is connected to the fuel return line L2 again, thereby allowing the LPG fuel of which the temperature is decreased by heat exchange while the LPG fuel passes through the canister 30, to move to the fuel return line L2.

To this end, the return tube 200 includes an inflow line 210, a passing line 220, and an outflow line 230 which are determined in accordance with the features of sections through which the LPG fuel passes.

First, the inflow line 210 branches off from the fuel return line L2, and is connected to an inlet side of the canister 30.

The passing line 220 is installed to pass through the canister 30, and defines a section for heat exchange of the returning LPG fuel.

One end of the outflow line 230 is connected to an outlet side of the canister 30, and the other end of the outflow line 230 is connected to the fuel return line L2, such that the LPG fuel, which has exchanged heat through the canister 30, moves to the fuel return line L2.

Here, a check valve 300 is installed in the outflow line 230, and the check valve 300 is installed in the outflow line 230 so as to block the LPG fuel from reversely flowing to the canister 30 when the LPG fuel, which returns from the engine 10, moves to the LPG tank 20 while passing through the fuel return line L2.

Meanwhile, a pathway of the LPG fuel passing through the canister 30 so as to decrease a temperature of the LPG fuel will be sequentially described with reference to FIG. 2.

First, when it is confirmed that pressure in the LPG tank 20 is 10 bar or higher, the 3-way valve 100 is turned on to allow the LPG fuel, which returns from the engine 10, to move to the inflow line 210.

Thereafter, when the LPG fuel, which moves along the inflow line 210, moves to the passing line 220, purge of the canister 30 is performed, such that an endothermic reaction is generated in the canister 30 as illustrated in FIG. 4, and as a result, thermal energy of the LPG fuel moving along the passing line 220 is lost, and a temperature of the LPG fuel is decreased.

In this case, the passing line 220 has a 'U' shape to increase a heat exchange area in the canister 30, and forms a plurality of bent regions in the canister 30 so as to ensure time required for the heat exchange.

Here, the thermal energy of the LPG fuel, which is lost, is transferred in the canister 30 such that heat may be transferred up to an edge of the canister 30, and as a result, detachment throughout the entire zone of the canister 30 is able, thereby effectively improving purge efficiency.

As described above, the LPG fuel at the decreased temperature is moved along the outflow line 230 and supplied to the fuel return line L2, and consequently, the LPG fuel may be supplied to the LPG tank 20 in a low temperature state.

As illustrated in FIG. 3, when it is confirmed that pressure in the LPG tank 20 is 10 bar or lower, the LPG fuel, which returns from the engine 10 and moves along the fuel return line L2, is supplied to the LPG tank 20 again.

That is, when pressure in the LPG tank 20 is 10 bar or lower, the 3-way valve 100 is turned off, and accordingly, the LPG fuel is blocked from being supplied to the inflow line 210 and moves along the fuel return line L2.

Here, the check valve 300, which is installed in the outflow line 230, is closed so as to prevent the LPG fuel, which passes through the branch region in which the 3-way valve 100 is installed, from reversely flowing along the outflow line 230 while passing through the fuel return line L2, and flowing to the canister 30.

Consequently, in the present exemplary embodiment, the LPG fuel, which returns from the engine 10, is supplied to the LPG tank 20 in a low temperature state by selectively opening and closing the 3-way valve 100 in accordance with the pressure in the LPG tank 20, such that it is possible to decrease the pressure in the LPG tank 20, and thus allow the pressure in the LPG tank 20 to be lower than charging pressure of the LPG fuel station, thereby filling the vehicle with the LPG fuel.

Figure 5:
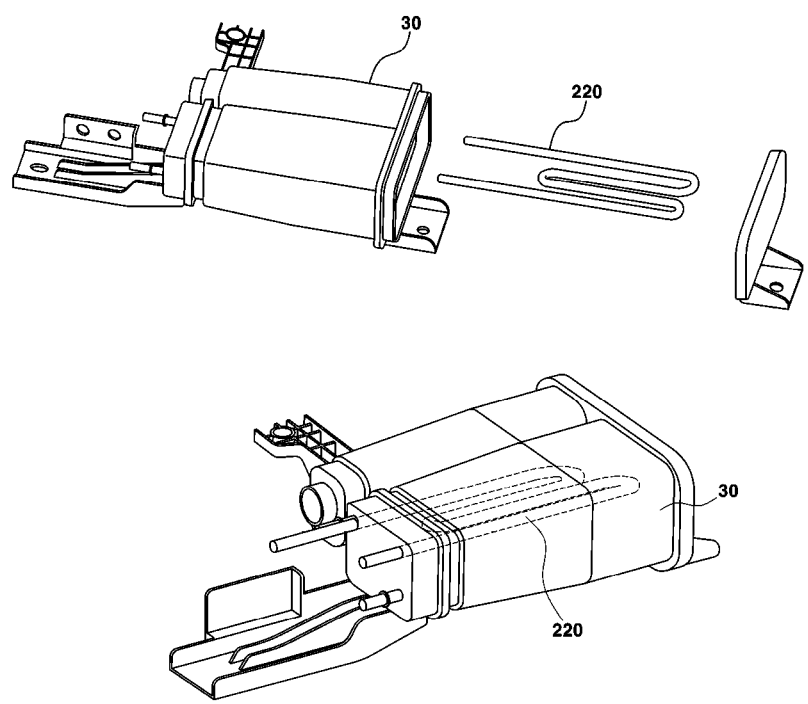
FIG. 5 is a view illustrating a state in which a passing line is installed in the fuel system for a bi-fuel vehicle according to the first exemplary embodiment of the present invention.
Figure 6:
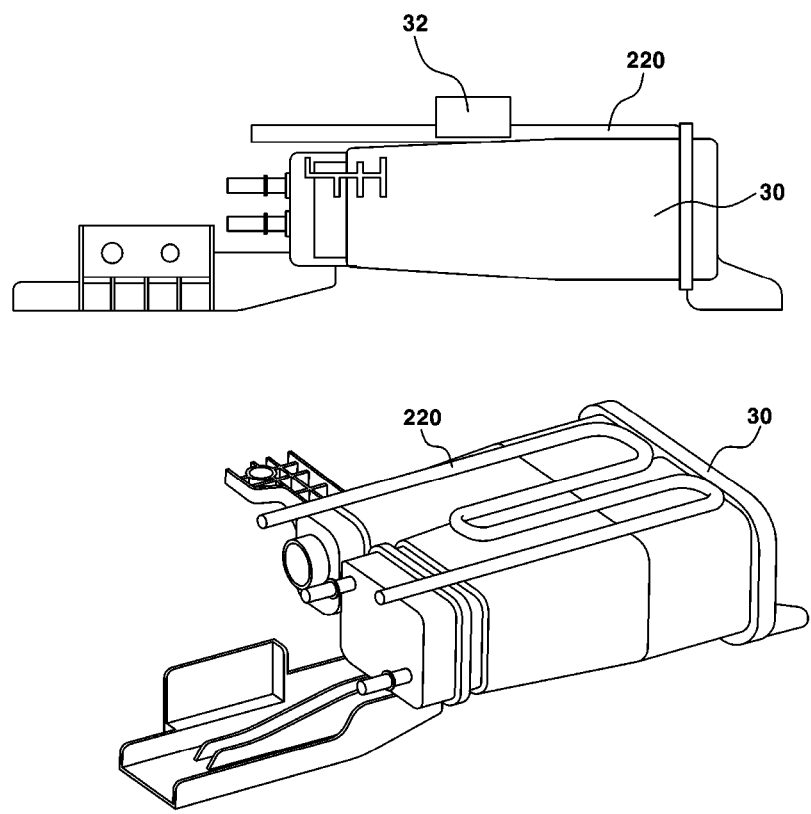
FIG. 6 is a view illustrating a state in which a passing line is installed in a fuel system for a bi-fuel vehicle according to a second exemplary embodiment of the present invention.

FIG. 5 is a view illustrating a state in which the passing line is installed in the fuel system for a bi-fuel vehicle according to the first exemplary embodiment of the present invention, and FIG. 6 is a view illustrating a state in which a passing line is installed in a fuel system for a bi-fuel vehicle according to a second exemplary embodiment of the present invention.

As illustrated in FIG. 5, the fuel system for a bi-fuel vehicle includes the return tube 200, and the return tube 200 is provided with the passing line 220 that defines the section for heat exchange of the returning LPG fuel.

Here, the passing line 220 may be installed in the canister 30.

This is to maximize heat exchange and heat transfer between the passing line 220 and the canister 30, and the passing line 220 may be inserted into the canister 30.

However, on the contrary, the passing line 220 may be installed and coupled outside the canister 30.

That is, the passing line 220 is coupled to one surface of the canister 30 by means of a fixing mounting bracket 32 so that the passing line 220 is in contact with the one surface of the canister 30, thereby effectively coping with a problem that the passing line 220 cannot be inserted into the canister 30 because of a shape and a size of the passing line 220.

Consequently, the passing line 220 may be selectively installed inside or outside the canister 30 depending on the circumstances as described above, but the passing line 220 serves to decrease a temperature of the returning LPG fuel by performing heat exchange while the LPG fuel passes through the canister 30.

Figure 7:
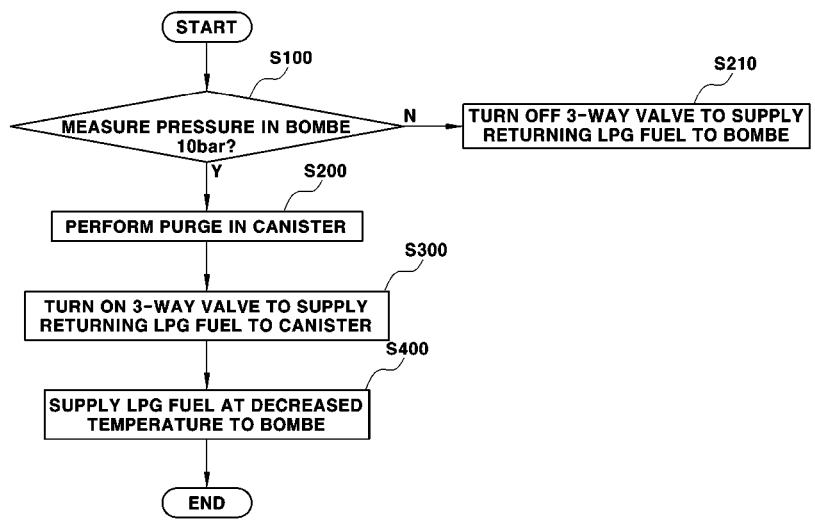
FIG. 7 is a view sequentially illustrating a method of filling a bi-fuel vehicle with LPG fuel according to the present invention.

Hereinafter, FIG. 7 is a view sequentially illustrating a method of charging a bi-fuel vehicle with LPG fuel according to the present invention.

As illustrated in FIG. 7, pressure in the LPG tank 20 is measured by an electronic control unit (ECU) of the vehicle (S100).

If it is confirmed that the pressure in the LPG tank 20 is higher than 10 bar corresponding to charging pressure of the LPG fuel station, purge of the canister 30 connected with the fuel tank 40 is performed first (S200).

Thereafter, the 3-way valve 100 installed in the fuel return line L2 is turned on to allow the LPG fuel, which returns from the engine 10, to move to the canister 30 through the inflow line 210 of the return tube 200 (S300).

When the LPG fuel passes through the passing line 220 provided in the canister 30, an endothermic reaction is generated in the canister 30 because purge is being performed in the canister 30, and as a result, the LPG fuel of which the temperature is decreased by heat exchange in the canister 30, moves to the fuel return line L2 along the outflow line 230 (S400).

Consequently, the LPG fuel at a low temperature, which is supplied to the fuel return line L2, is supplied to the LPG tank 20 so as to allow the pressure in the LPG tank 20 to be 10 bar or lower that is lower than charging pressure of the LPG fuel station.

Meanwhile, if it is confirmed in step S100 that the pressure in the LPG tank 20 is 10 bar or lower, the 3-way valve 100 is turned off to allow the LPG fuel to move to the LPG tank 20 while moving along the fuel return line L2 (S210).

In this case, the check valve 300, which is installed in the outflow line 230 that branches off from the fuel return line L2, is turned on to close the outflow line 230 so as to block the LPG fuel, which moves to the LPG tank 20 along the fuel return line L2, from reversely flowing to the outflow line 230 and flowing to the canister 30.

According to the present invention, the valve is controlled in accordance with the pressure in the LPG tank so that the LPG fuel, which returns from the engine, passes through the canister and heat exchange is performed in the canister, thereby decreasing a temperature of the LPG fuel that is supplied to the LPG tank.

Accordingly, in the present invention, as a temperature of the LPG fuel is decreased, the pressure in the LPG tank may be lower than charging pressure of the LPG fuel station, and as a result, it is possible to easily fill the bi-fuel vehicle with the LPG fuel regardless of high outside temperatures (e.g., a hot location, or summer temperatures).

Detachment efficiency in the canister is improved by thermal energy of the LPG fuel which is lost while the LPG fuel passes through the canister, thereby reusing the lost thermal energy of the LPG fuel.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel system for a bi-fuel vehicle, which is provided with an engine and an LPG tank which are connected to each other through a fuel supply line and a fuel return line through which liquefied petroleum gas (LPG) fuel passes, the fuel system comprising:
    a 3-way valve which is installed in the fuel return line, and selectively opened and closed to move returning LPG fuel to a canister connected with a fuel tank; and
    a return tube, which branches off from the fuel return line, installed so that the returning LPG fuel passes through the canister in accordance with an operation of the 3-way valve, allowing the LPG fuel of which the temperature is decreased by heat exchange while the LPG fuel passes through the canister to move to the fuel return line.

2. The fuel system of claim 1, wherein the return tube includes:
    an inflow line which branches off from the fuel return line, and is connected to an inlet side of the canister;
    a passing line which is installed to pass through the canister, and defines a section for heat exchange of the returning LPG fuel; and
    an outflow line which is connected to an outlet side of the canister, and allows the LPG fuel, which has exchanged heat, to move to the fuel return line.

3. The fuel system of claim 2, wherein the passing line is installed inside the canister.

4. The fuel system of claim 2, wherein the passing line is installed outside the canister.

5. The fuel system of claim 2, wherein the passing line has a 'U' shape to increase a heat exchange area in the canister.

6. The fuel system of claim 2, wherein the outflow line is provided with a check valve which blocks the LPG fuel, which returns from the engine, from reversely flowing to the canister when the returning LPG fuel moves to the LPG tank by passing through the fuel return line.

7. A method of charging a bi-fuel vehicle with liquefied petroleum gas (LPG) fuel, the method comprising the steps of:
- measuring pressure in a LPG tank;
- performing a purge of a canister connected with a fuel tank when the pressure in the LPG tank is higher than a predetermined pressure;
- turning on a 3-way valve installed in a fuel return line so as to allow the LPG fuel, which returns from an engine, to move to the canister through a return tube; and
- supplying the LPG fuel of which the temperature is decreased by heat exchange while the LPG fuel passes through the canister, to the fuel return line through the return tube so as to allow the LPG fuel to move to the LPG tank.

8. The method of claim 7, wherein the step of performing the purge includes turning off the 3-way valve so as to allow the LPG fuel to move along the fuel return line and move to the LPG tank when the pressure in the LPG tank is lower than the predetermined pressure.

9. The method of claim 8, wherein the step of performing the purge includes turning off a check valve installed in the return tube so as to block the LPG fuel, which moves to the LPG tank along the fuel return line, from reversely flowing to the return tube.

10. The method of claim 7, wherein the step of supplying the LPG fuel includes decreasing a temperature of the LPG fuel by absorbing heat of the LPG fuel which passes through the canister by the purge of the canister which is performed in the first step.

\* \* \* \* \*